United States Patent
Apfelbaum et al.

(10) Patent No.: US 12,141,611 B2
(45) Date of Patent: Nov. 12, 2024

(54) SIMULTANEOUS-MULTI-THREADING (SMT) AWARE PROCESSOR ALLOCATION FOR CLOUD REAL-TIME WORKLOADS

(71) Applicant: Red Hat, Inc., Raleigh, NC (US)

(72) Inventors: Marcel Apfelbaum, Ra'anana (IL); Swati Sehgal, Cork (IE)

(73) Assignee: Red Hat, Inc., Raleigh, NC (US)

( * ) Notice: Subject to any disclaimer, the term of this patent is extended or adjusted under 35 U.S.C. 154(b) by 585 days.

(21) Appl. No.: 17/464,155

(22) Filed: Sep. 1, 2021

(65) Prior Publication Data

US 2023/0063893 A1 Mar. 2, 2023

(51) Int. Cl.
*G06F 9/50* (2006.01)
(52) U.S. Cl.
CPC .................. *G06F 9/5027* (2013.01)
(58) Field of Classification Search
CPC ..................................................... G06F 9/5027
See application file for complete search history.

(56) References Cited

U.S. PATENT DOCUMENTS

| | | | |
|---|---|---|---|
| 8,027,808 B1 | 9/2011 | Becker | |
| 8,327,368 B2 | 12/2012 | Mall et al. | |
| 8,869,153 B2 | 10/2014 | Krieger et al. | |
| 8,898,675 B2 | 11/2014 | Matsumoto et al. | |
| 2004/0216101 A1 | 10/2004 | Burky et al. | |
| 2007/0300227 A1* | 12/2007 | Mall | G06F 9/3851 712/E9.053 |
| 2011/0265068 A1* | 10/2011 | Elnozahy | G06F 8/456 717/149 |

OTHER PUBLICATIONS

Carzola et al., Dynamically Controlled Resource Allocation in SMT Processors, Departament d'Arquitectura de Computadors Universitat Politecnica de Catalunya, Spain; Universidad de Las Palmas de Gran Canaria Edificio de Informatica y Matematicas Campus Universitario de Tafira, Spain.

Bulpin, Operating System Support for Simultaneous Multithreaded Processors, University of Cambridge, 2005.

Feliu et al., L1-Bandwidth Aware Thread Allocation in Multicore SMT Processors, Universitat Politècnica de València, València, Spain. 2013.

* cited by examiner

*Primary Examiner* — Wissam Rashid
(74) *Attorney, Agent, or Firm* — Kilpatrick Townsend & Stockton, LLP

(57) ABSTRACT

An example system includes a processor and a node agent executing on the processor. The node agent is configured to receive a message indicative of a workload, a processor policy of the workload, and a number of processor threads requested for the workload. The node agent is also configured to allow simultaneous allocation of a processor core to the workload and another workload based on the processor policy being a first policy. The node agent is also configured to prevent simultaneous allocation of the processor core to the workload and the other workload based on the processor policy being a second policy or a third policy. The node agent is also configured to allow simultaneous allocation of the processor core for two or more of the requested processor threads based on the processor policy being the second policy. The node agent is also configured to prevent simultaneous allocation of the processor core for more than one of the requested processor threads based on the processor policy being the third policy.

19 Claims, 5 Drawing Sheets

SIMULTANEOUS-MULTI-THREADING (SMT) AWARE PROCESSOR ALLOCATION FOR CLOUD REAL-TIME WORKLOADS

BACKGROUND

The present disclosure relates generally to computing resource allocation for workloads in a cloud environment. Computer systems may run workloads (e.g., applications or services) that are provided via a server or cloud. The workloads may be developed and deployed as a single unit or as multiple units, such as a collection of microservices. Additionally, the workloads may run within a pod as a group of containers, which may be run on physical or virtual machines. For example, containers may encapsulate a lightweight runtime environment for an application or a microservice. Containers and their associated application instances may be replicated on node clusters in order to scale applications to meet workload demands. Each workload or pod (e.g., tenant) may co-exist with other tenants in a cloud environment. Specifically, a cloud infrastructure may represent a multi-tenant processing infrastructure where resources are shared to increase system-wide performance thereby providing enhanced results to clients of the processing infrastructure. One such shared resource is memory, such as cache.

As technology advances, a variety of processor hardware designs and architectures were developed to provide different and/or improved processing capabilities. For example, some processor architectures allow simultaneous-multi-threading (SMT) execution of multiple software threads simultaneously. Each software thread may correspond to a stream of program instructions executable by a processor. An SMT-capable processor can execute more than one software thread simultaneously, for example, by executing multiple instructions from multiple different threads simultaneously during a single processor cycle. With such architecture, the SMT-capable processor can sometimes provide improvements in throughput compared to a processor that only executes one instruction from a single thread during each processor cycle.

SUMMARY

The present disclosure provides new and innovative systems and methods for dynamically allocating processors for execution of real-time workloads, especially in a cloud environment. In an example, a system includes a processor and a node agent executing on the processor. The node agent is configured to receive a message indicative of a workload, a processor policy of the workload, and a number of processor threads requested for the workload. The node agent is configured to allow simultaneous allocation of a processor core to the workload and another workload based on the processor policy being a first policy. The node agent is also configured to prevent simultaneous allocation of the processor core to the workload and the other workload based on the processor policy being a second policy or a third policy. The node agent is also configured to allow simultaneous allocation of the processor core for two or more of the requested processor threads of the workload based on the processor policy being the second policy. The node agent is also configured to prevent simultaneous allocation of the processor core for more than one of the requested processor threads based on the processor policy being the third policy.

In an example, a method includes receiving a message indicative of a workload, a processor policy of the workload, and a number of processor threads requested for the workload. The method also includes allowing simultaneous-multi-threading (SMT) execution of the workload with another workload on a processor core based on the processor policy being a first policy. The method also includes preventing SMT execution of the workload with the other workload on the processor core based on the processor policy being a second policy or a third policy. The method also includes allowing SMT execution of two or more of the requested processor threads of the workload on the processor core based on the processor policy being the second policy. The method also includes preventing SMT execution of multiple threads on the processor core when the processor core is executing the workload based on the processor policy being the third policy.

In an example, a non-transitory machine-readable medium stores program instructions which, when executed by a computer system, causes the computer system to determine a processor sharing policy of a workload and a number of processor threads requested for the workload. The non-transitory machine-readable medium also causes the computer system to allow simultaneous allocation of a processor core to the workload and another workload based on the processor sharing policy being a first policy. The non-transitory machine-readable medium also causes the computer system to prevent simultaneous allocation of the processor core to the workload and the other workload based on the processor sharing policy being a second policy or a third policy. The non-transitory machine-readable medium also causes the computer system to allow simultaneous allocation of the processor core for two or more of the requested processor threads of the workload based on the processor sharing policy being the second policy. The non-transitory machine-readable medium also causes the computer system to prevent simultaneous allocation of the processor core for more than one of the requested processor threads based on the processor sharing policy being the third policy.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Figure 1:
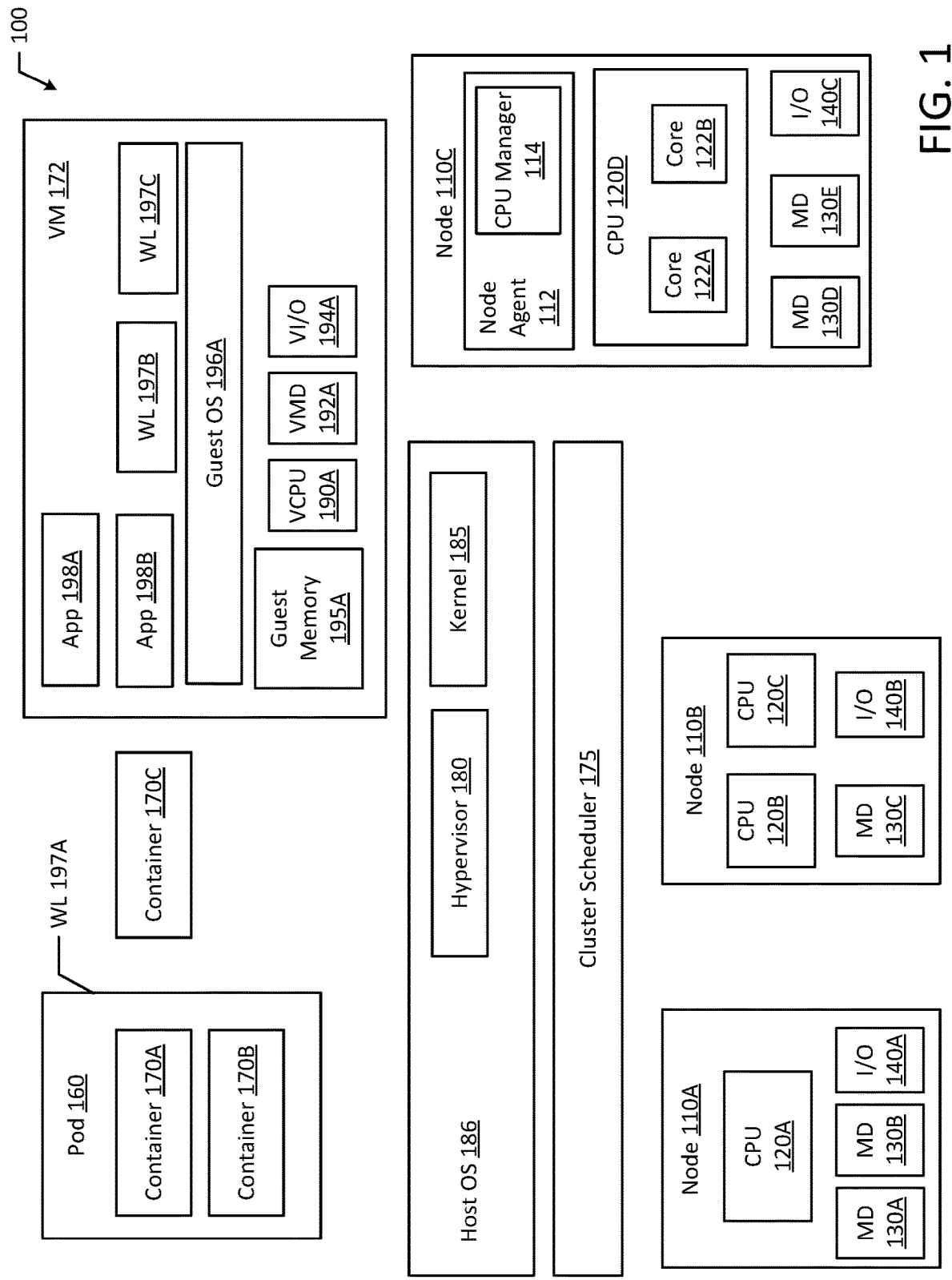
FIG. 1 illustrates a block diagram of an example computing system, according to an example embodiment of the present disclosure.

Techniques are disclosed for dynamically allocating processor capacity for execution of real-time workloads, especially in a cloud environment. For example, a cloud system can service a wide range of unrelated workloads sharing underlying hardware distributed across a network of physical nodes (e.g., computers, smartphones, etc.) of the cloud system. Each physical node may have different hardware capabilities, such as an amount of memory, one or more single-core or multi-core processors, and SMT-capable processor architectures or single threading processor architectures. In the cloud system, a dispatched workload can be associated with metadata that indicates an amount of processing power (e.g., number of processor threads, etc.) and/or data storage capacity (e.g., amount of memory, etc.) requested and/or authorized for the workload. The cloud system could thus select a suitable node (or multiple nodes) for executing the workload in accordance with the requested and/or authorized computing resources associated with the workload. However, in some scenarios, when multiple workloads run on shared computing resources such as an SMT-capable processor of a node, there may be ramifications both in terms of security and performance.

For example, security-wise, workloads sharing the same underlying processor core (e.g., by simultaneously executing threads of different workloads owned by different tenants on the processor core) may be susceptible to data leakage or other malicious attacks because the workloads may share the same high-level cache memory (e.g., L1 and/or L2 caches, etc.) of the processor core while the processor core is simultaneously executing these workloads. As another example, performance-wise, a latency-sensitive workload may encounter undesirable or less predictable computational delays associated with sharing processor core resources (e.g., caches, pipelines, etc.) due to SMT execution of the workload as compared to when a different processor core is executing each single thread of the latency-sensitive workload.

The systems and methods disclosed herein enable selectively isolating a real-time workload's processor occupancy from other workloads (e.g., workloads of other co-tenants on the cloud), allowing shared processor occupancy with the other workloads, or preventing SMT execution of the workload altogether (even when a processor capable of SMT operation is allocated to the workload). To facilitate this, an example system or method could associate each workload with a workload-specific processor sharing policy. For example, the owner of the workload or the cloud system itself can select a suitable processor sharing policy for each workload that considers the suitability of various security, performance, and/or cost ramifications of the selected policy with respect to the requirements of the workload. When the workload is dispatched to any particular node in this example, the node enforces the processor sharing policy of the workload by allowing or preventing simultaneous allocation of any processor core executing the workload according to the workload-specific processor sharing policy of the workload.

As a first example, the workload can be assigned to a first processor sharing policy (or no policy at all), which signals to the node that it should prioritize minimizing overall costs of running the workload by allocating any available processor cores (even processor cores simultaneously executing other workload(s)) for the workload, regardless of any potential security or performance risks associated with the first policy.

As a second example, the workload can be assigned to a second processor sharing policy, which allows the node to simultaneously allocate a same processor core to multiple threads of the same workload without allowing other workloads to run on that same processor core. In this way, the workload can benefit from performance and/or overall cost savings on at least some of the allocated processor cores without the security risks (e.g., data leakage on L1 or L2 caches) associated with sharing a processor core with other workloads (e.g., which may be owned by other tenants, etc.).

As a third example, the workload can be assigned to a third processor sharing policy, which does not allow the node to simultaneously allocate any processor core executing the workload. In other words, each processor core that the node allocates to the workload should only execute a single thread of the workload (e.g., even if the processor core is capable of SMT execution of multiple threads) and should not execute any other workload while it is allocated to that single thread of the workload. In this way, the workload can benefit security-wise by being isolated from other workloads and also potentially performance wise by ensuring predictable response times on all the allocated processor cores (which are each running only a single thread of the workload).

More generally, various example systems and methods herein may enable a user to customize and/or select specific policies for sharing processor resources (e.g., processor threads, data storage, etc.) to achieve security, performance, and/or cost goals specific to each workload while also potentially benefiting from the underlying hardware capabilities of the various physical nodes running the workloads where possible without violating the specific processor sharing policies of each workload.

FIG. 1 depicts a high-level component diagram of an example computing system 100 in accordance with one or more aspects of the present disclosure. The computing system 100 may include an operating system (e.g., host OS 186), one or more workloads WL 197A-C, and nodes (e.g., nodes 110A-C). The nodes 110A-C may be cluster nodes.

As used herein, a workload (e.g., WL 197A-C) may be an application (e.g., WL 197B-C, which are similar to App 198A-B running in virtual machine 172), a container (e.g., container 170C) or a pod 160 of containers (e.g., pod 160 with containers 170A-B). The workloads 197A-C (e.g., programs, applications, containers or pods) may be added to the computing system 100 to provide additional application functionality or to scale certain services or aspects of an application. For example, as processes are scaled to meet increased demand from clients, workloads 197A-C (e.g., containers or pods) may be replicated and deployed on various nodes and/or node clusters to handle the increased load.

The computing system 100 may also include a cluster scheduler 175 that initializes, schedules or implements workloads 197A-C on various nodes 110A-C. The cluster scheduler 175, which may be referred to generally as scheduler 175, may schedule workloads 197 (e.g., pods, containers, applications) based on resource availability, processor sharing policy of the workload 197, number of processor threads requested by the workload 197, availability of processor cores on the node 100A-C, and/or other scheduling policies or load balancing parameters of each workload 197 and/or node 110. In an example, the scheduler 175 may be a monolithic scheduler that handles all scheduling requests or a shared-state scheduler. A shared-state scheduler may have multiple scheduling components with full access to the entire cluster of resources. In an example, scheduler 175 may be a cluster scheduler that uses placement constraints and schedules applications. Additionally, scheduler 175 may schedule workloads 197 rapidly to avoid workloads 197 from sitting in a pending state. Processor occupancy information (e.g., current processor core allocations) of a cluster node (e.g., node 110A-C) may be exposed to the cluster scheduler 175.

As noted above, the scheduler 175 may schedule workloads 197 (e.g., pods, containers, applications) based on resource availability, number of processor threads requested for the workload 197, processor availability on the node 100A-C, scheduling policies or load balancing parameters of each workload 197 and/or node 110. In some examples, the load balancing parameters may be based on tenant per host density thresholds. For example, the load balancing parameters may be set to increase the tenant per host density or pod per host density, thereby conserving system resources. By maximizing the tenant per host density or workload 197 (e.g., pod 160) per host density, less hosts are used and system resources are conserved. Load balancing parameters may be based on a threshold level of available processors or processor cores on a cluster node (e.g., node 110A-C), a threshold quantity of WL(s) 197 on a cluster node, the type of WL(s) on a cluster node, etc. As previously mentioned, processor occupancy information (e.g., current processor occupancies) of a cluster node (e.g., node 110A-C) may be exposed to the cluster scheduler 175 for scheduling purposes. Each of the above considerations may be and optimizations may be monitored and adjusted in the event one or more of the WL(s) becomes a noisy neighbor.

In the illustrated example, pod(s) 160 may each include one or more containers 170A-B. As discussed above, a pod 160 may be a workload 197 (e.g., WL 197A). For example, containers 170A-B may be treated as a single unit of deployment in pod 160. In an example, containers 170A-B may be organized in pod 160 and may be co-located on the same node (e.g., node 110A) and share the same resources. Pod 160 and associated containers 170A-B may be located on node 110A and share the same resources, network, memory, and storage of the node 110A (e.g., CPU120A, memory devices 130A-B, and input/output device(s) 140A). Similarly, pod 160 may be located on a node cluster or group of nodes (e.g., nodes 110B-C). Each pod 160 may have a dedicated IP address that is shared by all the containers belonging to a respective pod 160. Additionally, a pod 160 and/or containers 170A-B scheduled to a node cluster may share the resources of the node cluster (e.g., CPU120B-D, memory devices 130C-D, and input/output device(s) 140B-C). In an example, multiple pods 160 may be located on the same node (e.g., node 110B). In another example, each pod 160 may be located on its own node 110A-C. Similarly, containers 170A-B may run on the same node (e.g., node 110A) or on different nodes 110, for example, each container 170 may be located on its own node 110.

Containers 170A-C may execute applications, services or microservices. As discussed above, a container 170 may be a workload 197 (e.g., container 170C may be considered a WL 197). In an example, the containers 170A-C may each run a process or service and the containers 170A-C may be any execution environment. For example, the containers 170A-C may be a server, such as a virtual server. It should be appreciated that the containers 170A-C may be standalone execution environments, similar to that of a virtual machine.

Virtual machine ("VM") 172 may include a guest OS(s), guest memory or virtual machine memory, a virtual CPU (VCPU), virtual memory devices (VMD), and virtual input/output devices (VI/O). For example, virtual machine 172 may include guest OS 196, guest memory or virtual machine memory 195, a virtual CPU(s) 190, a virtual memory device(s) 192, and a virtual input/output device(s) 194. Virtual machine memory or guest memory 195 may include one or more memory pages. In an example, VM 172 may execute the guest OS 196 and run applications 198A-B or WLs 197B-C, which may utilize the underlying VCPU 190, VMD 192, and VI/O device 194.

The computer system 100 may include one or more nodes 110A-C. The nodes 110A-C may be cluster nodes with one or more machines running in a cluster. Each node 110A-C may in turn include one or more physical processors (e.g., CPU 120A-E) communicatively coupled to memory devices (e.g., MD 130A-E) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Workloads 197 may be provisioned on the same host or node (e.g., node 110A) or different nodes. For example, WL 197A and WL 197B may both be provisioned on node 110A. Alternatively, WL 197A may be provided on node 110A while WL 197B is provisioned on node 110B. Nodes 110A-C may be non-uniform memory access ("NUMA") nodes.

In some examples, one or more of the nodes 110 may include a node agent (e.g., node agent 112 of node 110C). The node agent 112 is configured as an interface between the node 110C and other components (e.g., host OS 186, cluster scheduler 175, etc.) of the computer system 100. For example, the node agent 112 can receive messages or application programming interface (API) calls from the scheduler 175 (or the OS 186) indicating assignment of a workload 197 to the node 110C and other metadata associated with the assigned workload 197. CPU Manager 114 may then decide which of the processor cores 122A-B to allocate for execution of the assigned workload 197. In accordance with the present disclosure, the CPU manager 114 may monitor, control, and/or select the processor core allocations for one or more workloads 197 assigned to the node 110C.

For example, if a workload 197A has a first processor sharing policy that allows SMT execution of workload 197A with any other workload (e.g., workload 197B) on a same processor core (e.g., core 122A), then CPU manager 114 can allocate one or more of processor cores 122A-B to simultaneously execute different threads of the two workloads. As another example, if workload 197A has a second processor sharing policy that allows SMT execution only among processor threads of workload 197A, the CPU manager 114 may reserve a processor core (e.g., core 122A) for execution of one or more processor threads of workload 197A while preventing simultaneous allocation of core 122A to any other workload 197 when it is allocated to the workload 197A. As yet another example, if workload 197A has a third processor sharing policy that prevents SMT execution of workload 197A on any processor core, then CPU manager 114 may reserve a separate processor core for each single processor thread of workload 197A. In this way, CPU manager 114 can select different combinations of processor cores for each workload 197 assigned to node 110C depending on respective processor sharing policies of the assigned workloads 197.

As used herein, a processor may also be referred to as a central processing unit (CPU). Additionally, as used herein, physical processor or processor (e.g., CPU 120A-D) refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor (e.g., processor 120D which includes two processor cores 122A and 122B) which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

As discussed herein, a memory device 130A-E refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-D may be interconnected using a variety of techniques, ranging from a point-to-point processor interconnect, to a system area network, such as an Ethernet-based network. Local connections within each node, including the connections between a processor 120A-D and a memory device 130A-E may be provided by one or more local buses of suitable architecture, for example, peripheral component interconnect (PCI).

Figure 2:
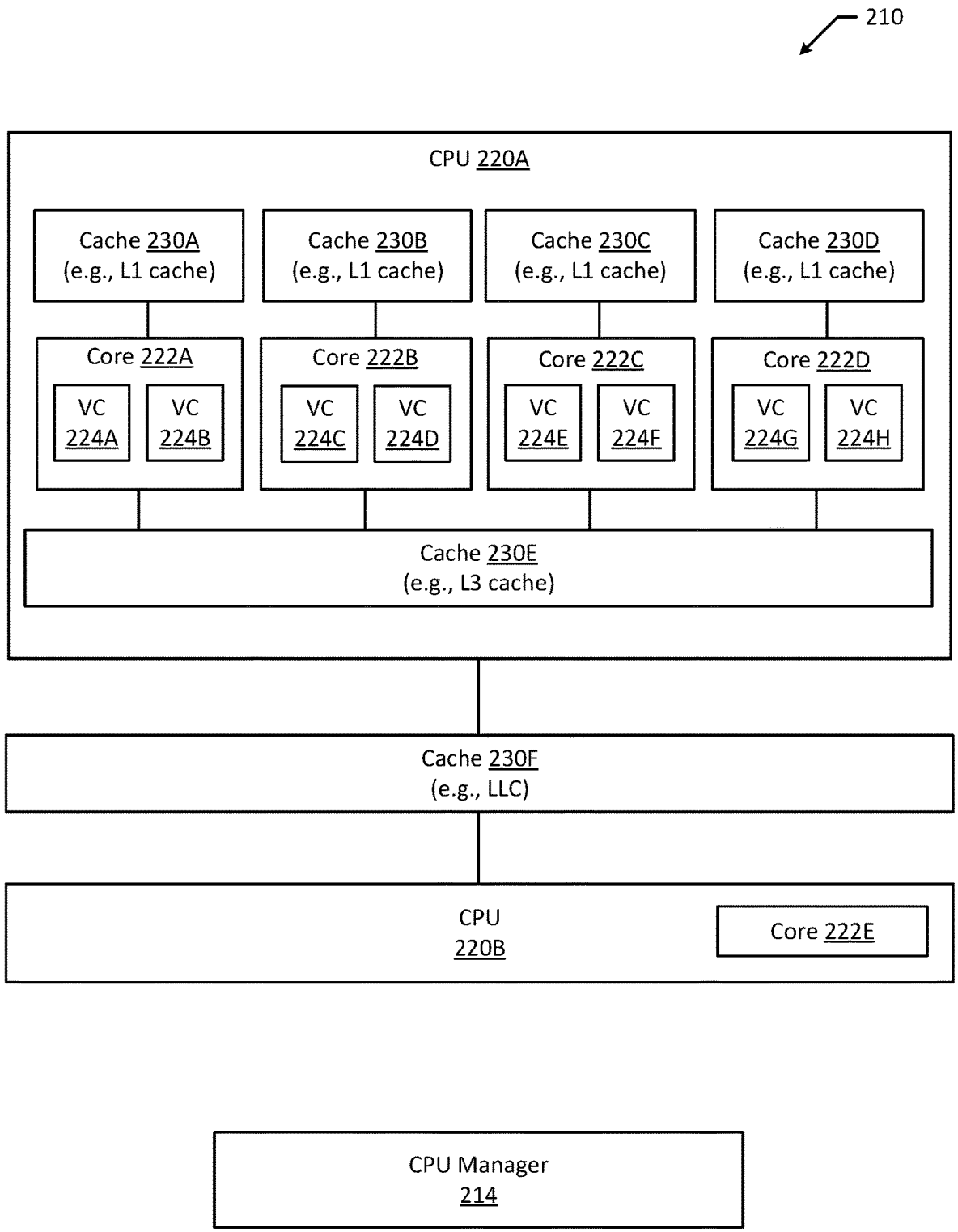
FIG. 2 illustrates a node that includes multiple processor cores in communication with different levels of cache memory, according to an example embodiment of the present disclosure.

FIG. 2 illustrates a block diagram of an example node 210 according to an example embodiment. In the illustrated example of FIG. 2, the node 210 includes multiple processors (or CPUs) 220A-B and a CPU Manager 214 that are similar respectively, to processors 120A-D and CPU Manager 114 of FIG. 1.

Processor 220A includes a plurality of processor cores 222A-22D. Each processor core 222A-D is linked to a dedicated high-level cache (e.g., L1 and/or L2 cache) of caches 230A-230D. For example, processor thread(s) executing on core 222A can directly access cache 230A (e.g., L1 cache, etc.), and so on. Additionally, multiple processor cores 222A-222D may share direct access to a lower level cache 230E, which could be an L3 or L4 cache depending on various processor architectures. Additionally, one or more processors 220 (e.g., processors 220A-B) of the node 210 may share a last level cache (LLC) 230F. Thus, each of caches 230A-F may be directly linked to a different combination of processors 220, physical cores 222, virtual cores 224, etc., depending the hardware architecture of the node 210 (and/or the processors therein) and/or the level of the respective cache 230 (e.g., level 1 (L1) cache, level 2 (L2) cache, level 3 (L3) cache, level 4 (L4) cache, last level cache (LLC), etc.). Processor 220B may also include one or more processor cores, exemplified by core 222E.

As noted above, each of the processor cores 222A-222D may be capable of SMT execution (e.g., Intel® hyper-threading, etc.) of multiple threads. As such, each of cores 222A-222D is illustrated to include multiple virtual cores (e.g., virtual cores 224A-224H). Virtual cores (VCs) 224A-224H may also be referred to herein interchangeably as hardware threads or processor threads (e.g., Intel® hyper-threads). In particular, two or more VCs 224 can simultaneously execute different software threads on a same processor core 222 that includes the two or more VCs and that is operable in a SMT mode to simultaneously execute multiple threads. In some examples, from the perspective of an operating system (e.g., OS 186) or a software application, a virtual core 224 in a 2-way or other SMT processor architecture can be considered as a processor or CPU similarly to a physical core 222 (e.g., core 222E) configured to only execute a single thread. In some examples, core 222E of processor 220B may also be capable of SMT execution of multiple threads. In other examples, core 222E may be configured to execute only a single thread.

By way of example, a workload 197 can be dispatched with a request for a certain number of processor threads or software threads or processors or CPUs to be used for executing the workload 197. From the perspective of an operating system (e.g., OS 186), each requested processor thread can be executed on a physical core (e.g., any of cores 222A-D) separately from other processor threads or can be executed simultaneously with one or more other processor threads (of the same WL and/or a different WL) by allocating different virtual cores of a same processor core to simultaneously execute the different processor threads. For example, if a WL 197 is dispatched with a request for three processors or CPUs or processor threads, the CPU manager 214 can allocate VC 224A and VC 224B of core 222A for two of the processor threads of the WL 197 and another VC 224C of core 222B to execute a third processor thread of the WL 197. In this example, two physical cores 222A and 222B are used to fulfill the request for allocating three CPUs to the WL 197.

Thus, in some examples, the CPU Manager 214 may select various combinations of one or more processor cores 222 and/or one or more virtual cores 224 for execution of a WL 197 based on at least a number of processor threads requested for the WL 197. In some examples, the number of requested processor threads of a workload can be indicated in a message (e.g., API call) transmitted from the scheduler 175/OS 186 and received by the CPU manager 214.

In some examples, the CPU Manager 214 may additionally or alternatively select a combination of one or more processor cores 222 and/or one or more virtual cores 224 for execution of a WL 197 based on a processor sharing policy of the WL 197. As noted above, virtual cores of a same processor core may share a same high level (e.g., L1, L2, etc.) cache (e.g., caches 230A-D). For instance, VCs 224C-D may share cache 230B and may also possibly share a data bus or other circuitry (not shown) connecting core 222B to cache 230B. Thus, if two different workloads 197 are assigned to each of the VCs 224C-D, the two workloads 197 may be susceptible to data leakage or other security risks associated with accessing the same high-level cache 230B of core 222B. To mitigate such risks, in an example, one (or both) of the workloads (e.g., WL 197B) may have a processor sharing policy that requires isolating any processor core allocated to WL 197B from other workloads (e.g., WL 197A, 197C, etc.). In this example, the CPU Manager 214 may detect the processor sharing policy of the WL 197B and responsively select a different core 222C-D to allocate for one or more processor threads of WL 197B if the cores 222A and/or 222B are currently executing a different WL (e.g., WL 197A or 197C). Further, in this example, the CPU manager 214 may maintain isolation of any processor core 222 allocated to WL 197B from other workloads 197 by preventing execution of the other workloads 197 on the processor core(s) 222 when those processor core(s) are allocated for any thread of WL 197B.

It should be appreciated that the systems, methods and techniques described herein may similarly be applied to nodes having fewer or more processors 220, processors having fewer or more cores 222, and/or processor cores having fewer or more virtual cores 224 than those shown in FIG. 2.

Additionally, it should be appreciated the functions described for CPU Manager 214 in the illustrated example of FIG. 2 can be alternatively or additionally performed by a node agent (e.g., node agent 112) or any other hardware or software component configured to manage allocation of resources (e.g., processors, processor cores, virtual cores, memories, data storage, etc.) in the node 210 to execute one or more workloads assigned to the node 210 (e.g., by schedule 175, OS 186, kernel 185, or any other external component of the system 100).

Figure 3:
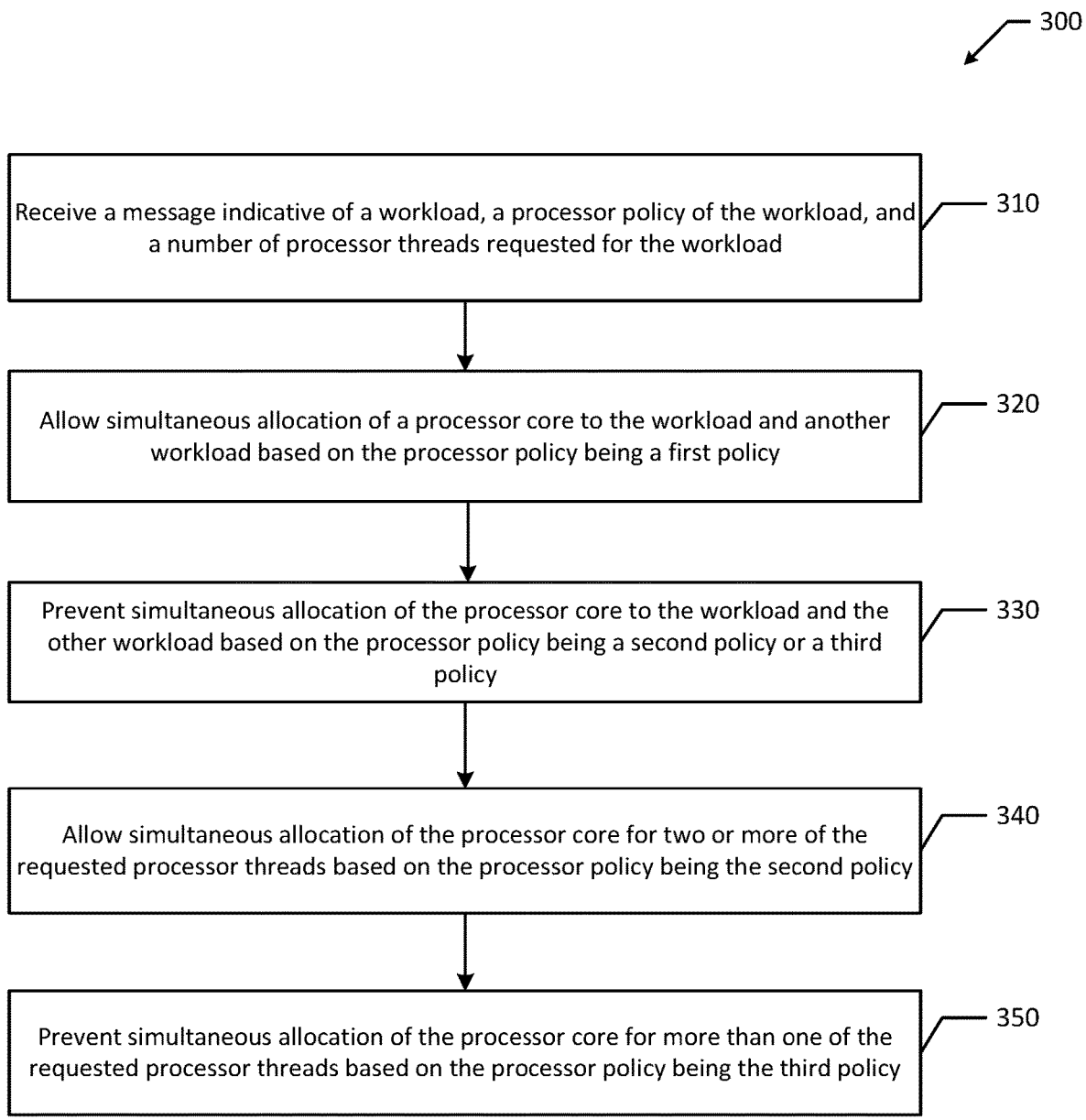
FIG. 3 illustrates a flowchart of an example process for processor allocation, according to an example embodiment of the present disclosure.

FIG. 3 illustrates a flowchart of an example method 300 for allocating processing resources of a node for execution of real-time workloads, according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, one or more blocks may be repeated, and/or some of the blocks may be removed. The method 300 may be performed by processing logic that may comprise hardware (circuitry, dedicated logic, etc.), software, or a combination of both. For example, method 300 can be implemented using any of the computer system 100, the node(s) 110A-C, the node agent 112, the CPU manager 114, the node 210, the CPU manager 214, and/or one or more other components illustrated in FIGS. 1-2.

At block 310, method 300 involves receiving a message indicative of a workload, a processor policy of the workload, and a number of processor threads requested for the workload. By way of example, the node agent 112 may receive the message (e.g., an API call, etc.) indicating assignment of one of the WLs 197 (e.g., WL 197A) to the node 110C.

In some examples, the message may include an indication of the processor policy of the workload and/or the number of processor threads requested for the workload. In other examples, the method 300 involves determining the processor policy and/or the number of requested processor threads based on an identification of the workload in the message. For example, the processor policy of the workload can be indicated in metadata or in tags accessible to the node 110C via the OS 186 and/or the scheduler 175 (or via any other component of system 100). In some examples, the processor policy of the workload may be preselected, predetermined, or otherwise assigned to the workload (e.g., by a tenant or owner of the workload, by an application 198 that dispatches the workload, by an OS 196/197, by a kernel 18, by a scheduler 175, and/or by a VM 172, etc.).

In some examples, method 300 involves determining whether a workload has a pre-selected processor policy, and assigning a particular policy to the workload in response to a determination that the workload does not have any pre-selected processor policy. In various examples, the particular policy (or default policy) may be a first policy that allows SMT execution of the workload with other workloads on a same processor core, a second policy that prevents SMT execution of the workload with other workloads on a same processor core but allows SMT execution of multiple threads of the workload on a same processor core, or a third policy that prevents SMT execution of more than one thread on any processor core that executes the workload. For example, the system 100 may be configured to assign a default policy to workloads that don't have an explicitly defined processor sharing policy. Alternatively, for example, the system 100 may be configured to assign a different default policy for all workloads owned by a particular tenant.

At block 320, method 300 involves allowing simultaneous allocation of a processor core to the workload and another workload based on the processor policy being a first policy.

The first policy could be a policy that attempts to minimize an overall cost of running the workload on a node by allowing SMT execution of the workload with other workloads on a same processor core. For instance, even though SMT execution of different workloads on a same processor core may expose them to the risk of data leakage in a high-level cache (e.g., one of caches 222A-D) of the processor core, the first policy may attempt to optimize an overall cost of running the workload while accepting the data leakage risk.

Referring back to FIG. 2 for example, each of the requested processor threads of the workload can be assigned by CPU manager 214 to any available virtual core 224 when the processor policy of the workload is the first policy (even if other virtual core(s) of the same processor core are executing other workloads). Additionally, CPU manager 214 may allow subsequent allocations of any processor core 222 that is currently executing one or more of the processor threads of the workload (and which has an available virtual core 224) to one or more other workloads for SMT execution.

At block 330, method 300 involves preventing simultaneous allocation of the processor core to the workload and the other workload based on the processor policy being a second policy or a third policy.

The second policy could be a policy that attempts to leverage SMT capabilities of SMT-capable processors by allowing SMT execution of multiple processor threads of the workload on a same processor core without allowing other workloads from executing on that same processor core while it is allocated to the workload. Referring back to FIG. 2 for example, one or more processor cores 222 can be reserved and/or allocated exclusively for the workload. In this example, two or more processor threads of the workload can be executed simultaneously on a first processor core (e.g., virtual cores 224A and 224B can be assigned to two different processor threads of the same workload), and/or a single processor thread can be executed on a second processor core without allocating other threads to that second processor core. For instance, if the workload only has three requested processor threads, two of the processor threads can be allocated to VCs 224A-B of core 222A, the third thread can be allocated to VC 224C of core 222B, and the other VC 224D can be kept idle or unallocated while the third thread is allocated to the core 222B.

Accordingly, in some examples, method 300 involves simultaneously allocating the processor core for a first thread and a second thread of the requested processor threads of the workload based on the processor policy being the second policy. In these examples, method 300 may also optionally involve allocating another processor core for a single thread of the requested processor threads of the workload based on the processor policy being the second policy and further based on the number of requested processor threads. For example, some virtual core(s) of a particular processor core allocated to the workload under the second policy can be kept unallocated if there are no other requested processor threads remaining for allocation to that particular processor core, in line with the example above.

The third policy could be a policy that attempts to maximize the number of processor cores reserved for the workload by reserving a separate processor core for each single thread of the requested processor threads of the workload (even if the reserved processor core(s) is capable of SMT execution of multiple threads simultaneously). Referring back to FIG. 2 for example, in a scenario where the number of requested processor threads of the workload (e.g., indicated by the message received at block 310) is three processor threads and the processor policy of the workload is the third policy, the CPU manager 214 may reserve a different core 222 for each of the three requested processor threads of the workload (e.g., core 222A for a first thread, core 222B for a second thread, and core 222C for a third thread). Thus, in this example, each of the reserved processor cores allocated to the workload may have an unallocated virtual core; and the CPU manager 214 may continue preventing any allocation to those unallocated virtual cores while the workload is allocated to their physical processor cores under the third policy.

Accordingly, in some examples, method 300 involves selecting one or more processor cores for execution of the workload based on the processor policy of the workload and the number of processor threads requested for the workload. In some examples, the selected one or more processor cores may include a first processor core (e.g., core 222A) of a first processor (e.g., processor 220A) of a node (e.g., node 210) and a second processor core (e.g., core 222E) of a second processor (e.g., processor 220B) of the node (e.g., node 210). In other examples, all the selected one or more processor cores (e.g., cores 222A-D) may be included in a same multi-core processor In some examples, method 300 involves maintaining isolation of the workload on the processor core by preventing execution of any other workload on the processor core while the processor core is allocated to the workload, in line with the discussion above.

At block 340, method 300 involves allowing simultaneous allocation of the processor core for two or more of the requested processor threads of the workload based on the processor policy being the second policy. As noted above for example, when the workload has the second policy, a processor core (e.g., core 222A) can be allocated for SMT execution of more than one processor thread of the workload (e.g., by allocating VCs 224A-B to different processor threads of the same workload, etc.).

At block 350, method 300 involves prevent simultaneous allocation of the processor core for more than one of the requested processor threads based on the processor policy being the second policy. As noted above for example, when the workload has the third policy, each processor core (e.g., cores 222A-C) allocated to the workload is allocated for execution of only one of the requested processor threads of the workload.

In some examples, method 300 involves allowing or preventing simultaneous allocation of the processor core (at blocks 320-350) further based on a determination that the processor core is capable of SMT execution of multiple threads. Referring back to FIG. 1 for example, if cores 122A and/or 122B do not support SMT execution, then the allowing or preventing steps of blocks 320-350 may be omitted when deciding whether to select cores 122A and/or 122B for executing the workload.

Figure 4:
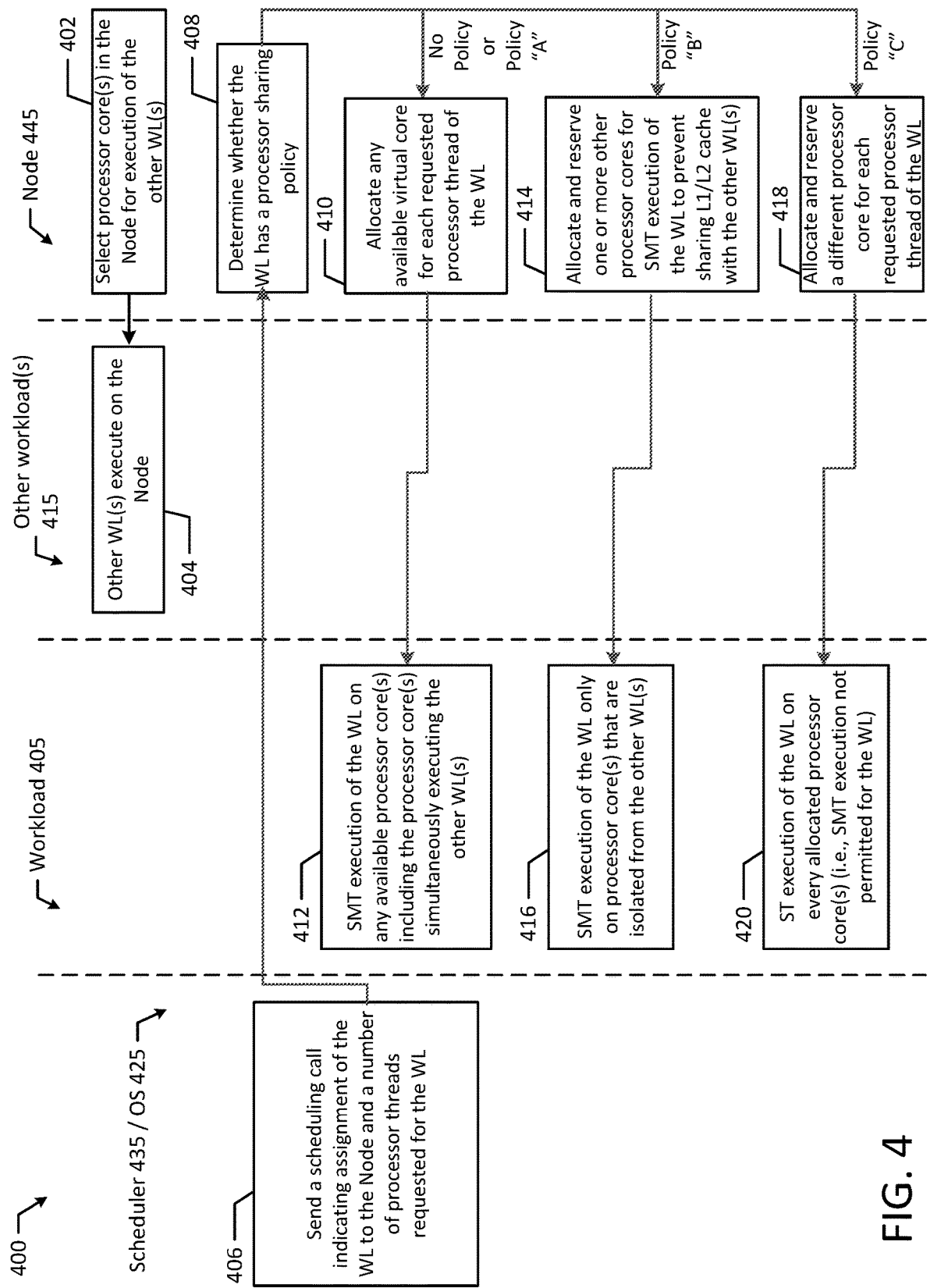
FIG. 4 illustrates a flow diagram of an example process for dynamic processor allocation for real-time workloads, according to an example embodiment of the present disclosure.

FIG. 4 illustrates a flowchart of an example method 400 for dynamically allocating processing resources in a node for execution of real-time workloads in accordance with an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, one or more blocks may be repeated, and some of the blocks described are optional. For example, a scheduler 435 or an operating system (e.g., OS 425, such as host OS 186) may communicate with a workload 405, other workloads 415, and/or node 445 to perform the example method 400 to dynamically allocate processor cores.

At block 402, the node 445 selects one or more processor cores in the Node 445 for execution of the other workload(s) 415 on the node 445. In turn, at block 404, the other workloads 415 execute on the Node 445. The other WL(s) 415 may each have different policies. For example, the other WL(s) 415 may have the first policy, in which the other WL(s) 415 are permitted to share processor cores (via SMT execution) with each other and/or with the WL 405.

At block 406, the scheduler 435/OS 425 sends a scheduling call to the node 445. The scheduling call, for example, may include an API call or any other message indicating assignment of the WL 405 to the Node 445. The scheduling call may also indicate a number of processor threads requested for the WL 405.

At block 408, the node 445 determines wither the WL 405 has a processor sharing policy. The processor sharing policy may included in the scheduling call or may be obtained by the node from metadata or other tags associated with the WL 405.

At block 410, if the WL 405 does not have a processor sharing policy or if it has a first policy (Policy "A"), the node allocates any available virtual core for each requested processor thread of the WL 405, in line with the description at block 320 of the method 300. Thus, at block 412, the workload 405 executes on the node 445 including SMT execution of the WL 405 on any available processor core(s) of the node 445 including processor core(s) that are simultaneously including other WL(s) 415.

At block 414, if the WL 405 has a second policy (policy "B"), then the node 445 allocates and reserves one or more other processor cores for SMT execution of the WL 405 (different from the processor core(s) executing the other WL(s) 415) to prevent sharing L1/L2 cache with the other WL(s) 415, in line with the description of blocks 330 and 340 of method 300. Thus, at block 416, the WL 405 executes on the node 445 whereby SMT execution of the WL 405 is only permitted on processer core(s) of the node 445 that are isolated from the other WL(s) 415.

At block 418, if the WL 405 has a third policy (policy "C"), then the node 445 allocates and reserves a different processor core for each of the requested processor threads of the WL 405, in line with the description of blocks 330 and 350 of method 300. In turn, at block 420, the WL 405 executes on the node 445 whereby only single-thread execution of the WL 405 is permitted on every processor core allocated to the WL 405 (i.e., SMT execution not permitted on any processor core of the node 445 that is allocated to the WL 405).

Figure 5:
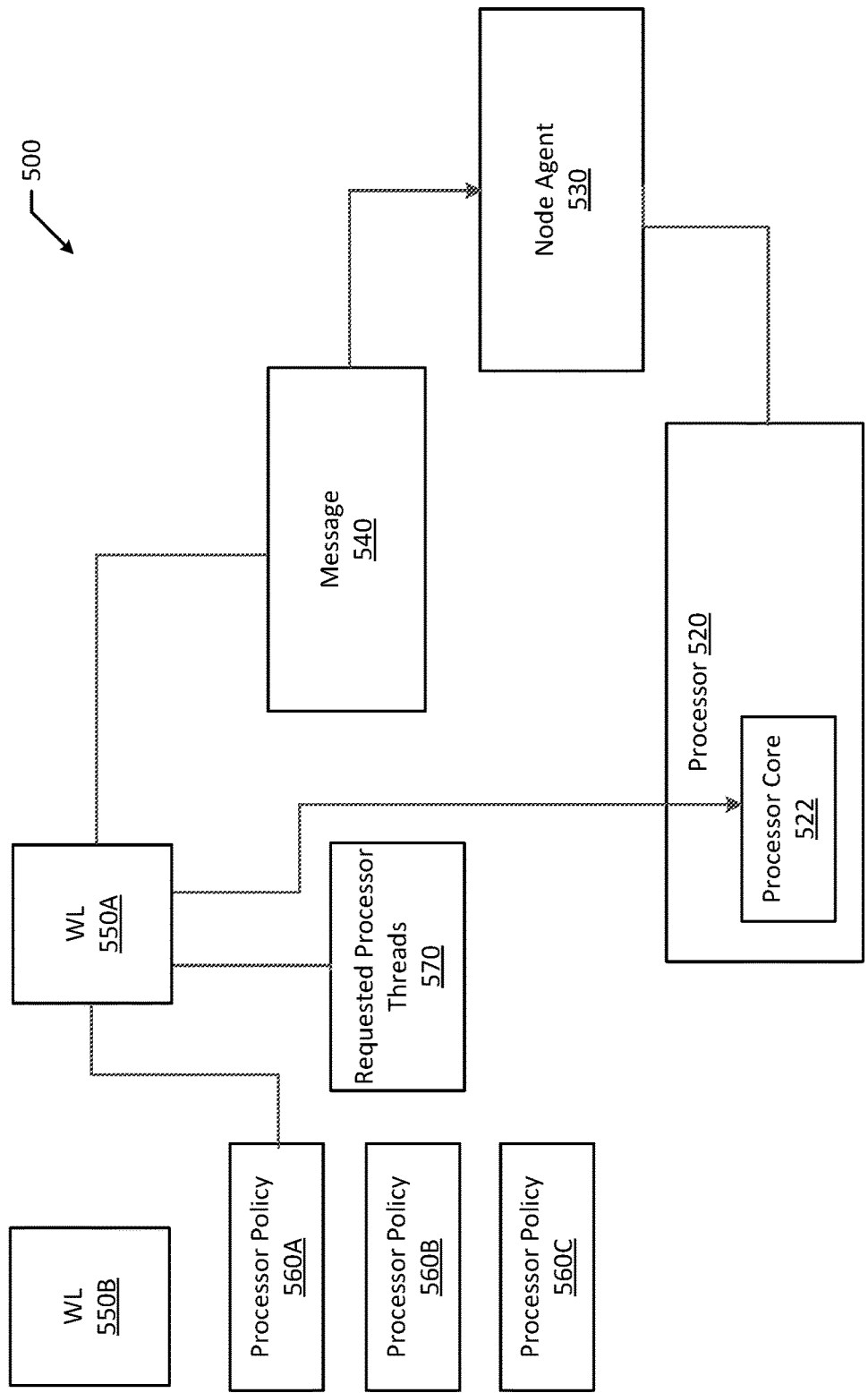
FIG. 5 illustrates a block diagram of an example processor allocation system, according to an example embodiment of the present disclosure.

FIG. 5 is a block diagram of an example processing resource allocation system 500 according to an example embodiment of the present disclosure. The system 500 includes a processor 520, a processor core 522, and a node agent 530 executing on the processor 520. The node agent 530 may be configured to receive a message 540 indicating a workload 550A, a processor policy of the workload 550A, and a number of processor threads 570 requested for the workload 550A. The node agent 530 may also be configured to allow simultaneous allocation of the processor core 522 to the workload 550A and another workload 550B based on the processor policy of the workload 550A being a first policy 560A, prevent simultaneous allocation of the processor core 522 to the workload 550A and the other workload 550B based on the processor policy being a second policy 560B or a third policy 560C, allow simultaneous allocation of the processor core 522 to two or more of the requested processor threads 570 of the workload 550A based on the processor policy being the second policy 560B, and prevent simultaneous allocation of the processor core 522 to more than one of the requested processor threads 570 based on the processor policy being the third policy 560C.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system comprising:
a processor; and
a node agent executing on the processor, the node agent configured to:
receive a message indicative of a workload, a processor policy of the workload, and a number of processor threads requested for the workload;
allow simultaneous allocation of a processor core to the workload and another workload based on the processor policy being a first policy;
prevent simultaneous allocation of the processor core to the workload and the other workload based on the processor policy being a second policy or a third policy;
allow simultaneous allocation of the processor core for two or more of the requested processor threads based on the processor policy being the second policy;
prevent simultaneous allocation of the processor core for more than one of the requested processor threads based on the processor policy being the third policy;
based on the processor policy being the first policy, operate the processor core in a simultaneous-multi-threading (SMT) configuration to simultaneously execute the workload and the other workload; and
based on the processor policy being the second policy or the third policy, executing the other workload on one or more other processor cores different than one or more processor cores allocated to the workload.

2. The system of claim 1, wherein the node agent is configured to:
select, for execution of the workload, one or more processor cores based on the processor policy of the workload and the number of processor threads requested for the workload.

3. The system of claim 1, wherein the node agent is configured to allow or prevent simultaneous allocation of the processor core further based on a determination that the processor core is capable of simultaneous-multi-threading (SMT) execution of multiple threads.

4. The system of claim 1, wherein the node agent is further configured to:
based on the processor policy being the second policy or the third policy, maintain isolation of the workload on the processor core by preventing execution of any other workload on the processor core while the processor core is allocated to the workload.

5. The system of claim 1, wherein the node agent is further configured to:
allocate different respective processor cores for each of the requested processor threads of the workload based on the processor policy being the third policy.

6. The system of claim 1, wherein the node agent is further configured to:
based on the processor policy being the second policy, simultaneously allocate the processor core for a first thread and a second thread of the requested processor threads of the workload, wherein simultaneously allocating the processor core causes the processor core to execute the first thread and the second thread simultaneously by operating in the SMT configuration.

7. The system of claim 6, wherein the node agent is further configured to:
based on the processor policy being the second policy and further based on the number of requested processor threads, allocate another processor core for a single thread of the requested processor threads of the workload, wherein allocation of the other processor core for the single thread prevents simultaneous execution of multiple threads by the other processor core while the other processor core is allocated for the single thread.

8. The system of claim 1, wherein the node agent is further configured to:
based on the processor policy being the third policy, allocate the processor core for a single thread of the requested processor threads of the workload, wherein allocation of the processor core for the single thread prevents simultaneous execution of multiple threads by the processor core while the processor core is allocated for the single thread.

9. The system of claim 8, wherein the node agent is further configured to:

based on the processor policy being the third policy, allocate another processor core for another single thread of the requested processor threads of the workload.

10. The system of claim 1, wherein the node agent is further configured to:
based on the processor policy being the second policy, operating the processor core in the SMT configuration to simultaneously execute the two or more of the requested processor threads of the workload; and
based on the processor policy being the third policy, operating the processor core to execute a single thread of the requested processor threads of the workload.

11. The system of claim 1, further comprising at least one of a cluster scheduler and an operating system (OS), wherein the at least one of the cluster scheduler and the OS is configured to provide the message to the node agent.

12. The system of claim 1, further comprising:
a node that includes the node agent and a plurality of processor cores, wherein the node agent is configured to select one or more processor cores, for execution of the workload, from the plurality of processor cores of the node.

13. The system of claim 12, wherein the processor is a multi-core processor of the node, and wherein all the selected one or more processor cores are in the multi-core processor.

14. The system of claim 12, wherein the node includes a plurality of processors, wherein the processor is a first processor of the plurality of processors, wherein the node agent is further configured to select, for execution of the workload, a first processor core in the first processor and a second processor core in a second processor of the plurality of processors.

15. A method comprising:
receiving a message indicative of a workload, a processor policy of the workload, and a number of processor threads requested for the workload;
allowing simultaneous-multi-threading (SMT) execution of the workload with another workload on a processor core based on the processor policy being a first policy;
preventing SMT execution of the workload with the other workload on the processor core based on the processor policy being a second policy or a third policy;
allowing SMT execution of two or more of the requested processor threads of the workload on the processor core based on the processor policy being the second policy;
preventing SMT execution of multiple threads on the processor core when the processor core is executing the workload based on the processor policy being the third policy;
based on the processor policy being the first policy, operate the processor core in a simultaneous-multi-threading (SMT) configuration to simultaneously execute the workload and the other workload; and
based on the processor policy being the second policy or the third policy, executing the other workload on one or more other processor cores different than one or more processor cores allocated to the workload.

16. The method of claim 15, further comprising:
selecting, for execution of the workload, one or more processor cores including the processor core based on the processor policy of the workload, the number of processor threads requested for the workload, and other processor policies of other workloads.

17. The method of claim 15, further comprising:
determining whether the processor core is capable of SMT execution of multiple threads, wherein allowing or preventing SMT execution on the processor core is further based on a determination that the processor core is capable of SMT execution of multiple threads.

18. The method of claim 15, further comprising:
based on the processor policy being the second policy or the third policy, maintaining isolation of the workload on the processor core by preventing simultaneous execution of any other workload on the processor core while the processor core is allocated to the workload.

19. A non-transitory machine-readable medium storing instructions that, when executed by a computer system, cause the computer system to:
determine a processor sharing policy of a workload and a number of processor threads requested for the workload;
allow simultaneous allocation of a processor core to the workload and another workload based on the processor sharing policy being a first policy;
prevent simultaneous allocation of the processor core to the workload and the other workload based on the processor sharing policy being a second policy or a third policy;
allow simultaneous allocation of the processor core for two or more of the requested processor threads of the workload based on the processor sharing policy being the second policy;
prevent simultaneous allocation of the processor core for more than one of the requested processor threads based on the processor sharing policy being the third policy; and
based on the processor policy being the second policy and further based on the number of requested processor threads, allocate another processor core for a single thread of the requested processor threads of the workload, wherein allocation of the other processor core for the single thread prevents simultaneous execution of multiple threads by the other processor core while the other processor core is allocated for the single thread.

* * * * *